(12) United States Patent
Takano (10) Patent No.: US 10,649,938 B2
(45) Date of Patent: *May 12, 2020

(54) INFORMATION PROCESSING APPARATUS AND METHOD OF TRANSFERRING DATA

(71) Applicant: Ricoh Company, Ltd., Tokyo (JP)

(72) Inventor: Satoshi Takano, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 332 days.

This patent is subject to a terminal disclaimer.

(21) Appl. No.: 15/222,268

(22) Filed: Jul. 28, 2016

(65) Prior Publication Data

US 2017/0046294 A1 Feb. 16, 2017

(30) Foreign Application Priority Data

Aug. 10, 2015 (JP) ................................ 2015-157886

(51) Int. Cl.
| | | |
|---|---|---|
| H04N 5/232 | (2006.01) | |
| G06F 13/40 | (2006.01) | |
| H04N 1/32 | (2006.01) | |
| G06F 13/42 | (2006.01) | |
| G06T 1/60 | (2006.01) | |
| H04N 5/343 | (2011.01) | |
| H04N 5/3745 | (2011.01) | |

(52) U.S. Cl.
CPC ...... *G06F 13/4022* (2013.01); *G06F 13/4027* (2013.01); *G06F 13/4282* (2013.01); *G06T 1/60* (2013.01); *H04N 1/32587* (2013.01); *H04N 1/32603* (2013.01); *H04N 5/23245* (2013.01); *H04N 5/343* (2013.01); *H04N 5/3745* (2013.01)

(58) Field of Classification Search
CPC ........ H04N 5/341; H04N 5/343; H04N 5/225; H04N 5/365; H04N 5/23245; H04N 5/3745; H04N 13/356; G06F 13/4022
See application file for complete search history.

(56) References Cited

U.S. PATENT DOCUMENTS

| | | | |
|---|---|---|---|
| 2008/0303917 A1* | 12/2008 | Shu | ........................... G06T 1/20 348/222.1 |
| 2012/0194838 A1 | 8/2012 | Takano | |
| 2013/0063630 A1* | 3/2013 | Yanada | .................... H04N 9/07 348/266 |

FOREIGN PATENT DOCUMENTS

| | | |
|---|---|---|
| JP | 2007-110470 | 4/2007 |
| JP | 2008-236573 | 10/2008 |

(Continued)

OTHER PUBLICATIONS

Office Action dated Apr. 23, 2019 in Japanese Patent Application No. 2015-157886 (with unedited computer generated English translation).

*Primary Examiner* — Ernest Unelus
(74) *Attorney, Agent, or Firm* — Oblon, McClelland, Maier & Neustadt, L.L.P.

(57) ABSTRACT

An information processing apparatus includes a first bus interface to receive first data transferred in a pixel-parallel transfer mode, a second bus interface to receive second data transferred in a line-parallel transfer mode, a selector to select one of the first data transferred in the pixel-parallel transfer mode and the second data transferred in the line-parallel transfer mode, as input data, a transfer switching circuit to switch between the line-parallel transfer mode and the pixel-parallel transfer mode to process the input data according to the switched transfer mode.

19 Claims, 8 Drawing Sheets

(56) References Cited

FOREIGN PATENT DOCUMENTS

| JP | 2013-62714 A | 4/2013 |
| JP | 2015-89012 A | 5/2015 |

* cited by examiner

FIG. 8

INFORMATION PROCESSING APPARATUS AND METHOD OF TRANSFERRING DATA

CROSS-REFERENCE TO RELATED APPLICATIONS

This patent application is based on and claims priority pursuant to 35 U.S.C. § 119(a) to Japanese Patent Application No. 2015-157886, filed on Aug. 10, 2015, in the Japan Patent Office, the entire disclosure of which is hereby incorporated by reference herein.

BACKGROUND

Technical Field

Embodiments of the present invention relate to an information processing apparatus and a method of transferring data.

Description of the Related Art

An information processing apparatus including an image forming apparatus usually transfers data in synchronization with a line synchronization signal when transferring the data from an image sensor, such as a CMOS sensor, to an arithmetic processing device, which is hereinafter referred to as a digital signal processor (DSP). An image processing device provided in the information processing apparatus usually performs image processing on image data such as encoding with software executing on a CPU. In recent years, a technique for encoding the data using hardware before transferring to the DSP has been devised and employed.

In conventional systems using such hardware to perform image processing on image data transferred line-by-line, the data output from the image sensor on a line cycle basis is output to the DSP on a line cycle basis. The DSP performs image processing on the image data on a line cycle basis. Some types of hardware, however, may transfer data of two lines in parallel depending on an output state of image data. Such hardware enables complicated image processing through processing data of a plurality of lines in parallel.

SUMMARY

An information processing apparatus, according to one embodiment, includes a first bus interface to receive first data transferred in a pixel-parallel transfer mode, a second bus interface to receive second data transferred in a line-parallel transfer mode, a selector to select one of the first data transferred in the pixel-parallel transfer mode and the second data transferred in the line-parallel transfer mode, as input data, a transfer switching circuit to switch between the line-parallel transfer mode and the pixel-parallel transfer mode to process the input data according to the switched transfer mode.

BRIEF DESCRIPTION OF THE SEVERAL VIEWS OF THE DRAWINGS

A more complete appreciation of the disclosure and many of the attendant advantages and features thereof can be readily obtained and understood from the following detailed description with reference to the accompanying drawings.

DETAILED DESCRIPTION

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof. In describing example embodiments illustrated in the drawings, specific terminology is employed for the sake of clarity. However, the present disclosure is not intended to be limited to the specific terminology so selected and it is to be understood that each specific element includes all technical equivalents that operate in a similar manner.

Figure 1:
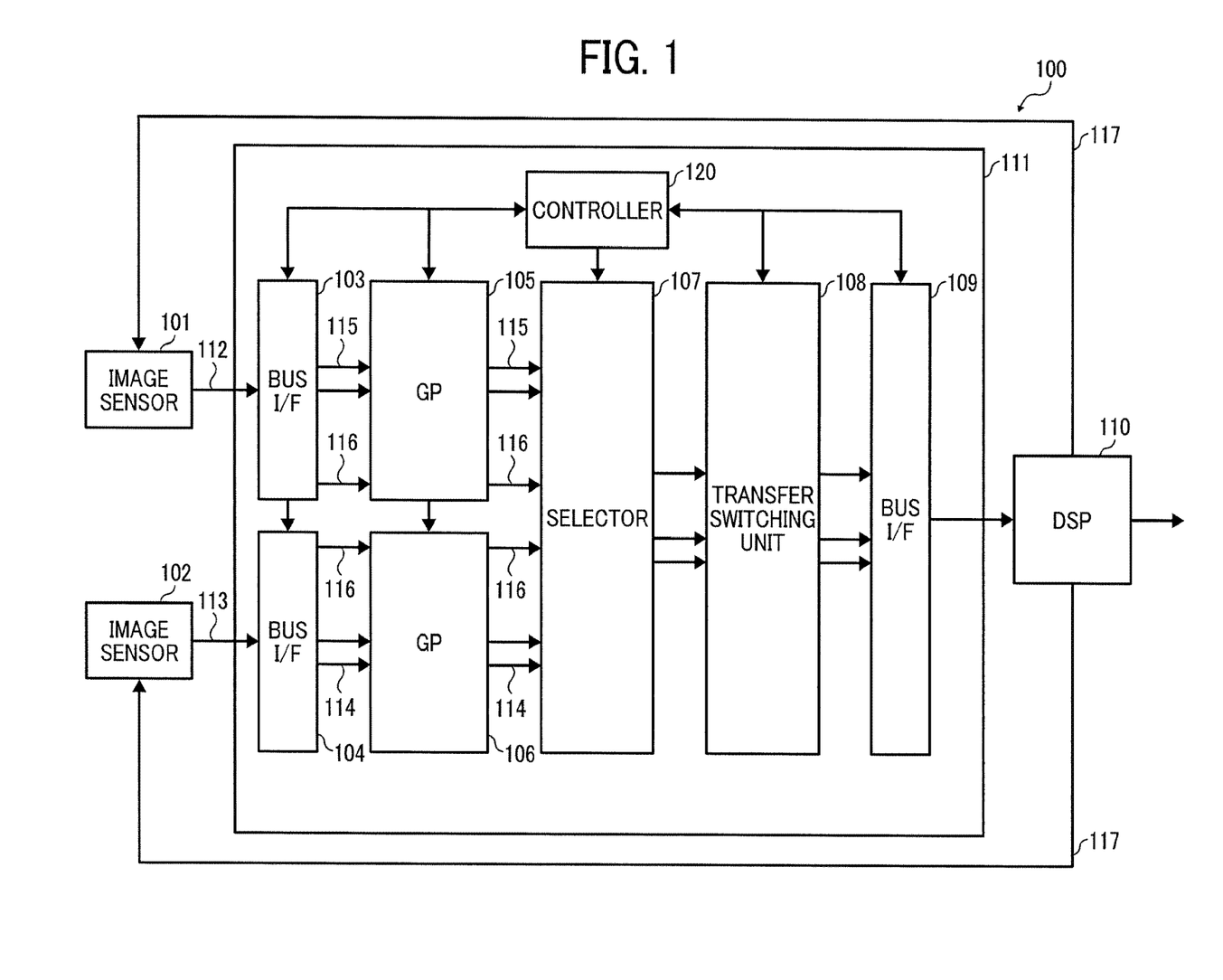
FIG. 1 is a hardware block diagram of an information processing apparatus according to an embodiment of the present invention.

A description is now given of exemplary embodiments of the present invention. The embodiments, however, are not intended to be limiting of the present invention. FIG. 1 is a hardware block diagram of an information processing apparatus 100 according to an embodiment of the present invention. The information processing apparatus 100 includes a processing engine 111, a digital signal processor (DSP) 110, and two image sensors 101 and 102. In the information processing apparatus 100, the processing engine 111 receives image data from the image sensors 101 and 102 and then processes the image data in a suitable image format to be output from the DSP 110.

Any one or both of the image sensors 101 and 102 illustrated in FIG. 1 may be built in the information processing apparatus 100. Alternatively, any one or both of the image sensors 101 and 102 may be externally provided and connected to the information processing apparatus 100 via any desired bus, such as a universal serial bus (USB). The image sensors 101 and 102 transfer image data on a single line basis or on a multiple line basis based on a frame synchronization signal and a line synchronization signal, which are collectively denoted 117, output from the DSP 110. This transfer of the image data to the processing engine 111 is performed by preferably using a differential serial bus interface such as a low voltage differential signaling (LVDS).

In the embodiment, applying a differential serial bus system to bus interfaces (I/Fs) 103 and 104 can improves noise resistance when data is transferred from an imaging sensor to an image forming apparatus. In addition, the application of such bus system allows an image processor to sense an image area, resulting in efficient processing of the image data. According to one exemplary embodiment using two imaging sensors in the embodiment, the two image sensors 101 and 102 may be used for a shot image and for an automatic exposure (AE), respectively.

In still another exemplary embodiment in which a single image sensor transfers image data either on a single line basis or on a multiple line basis, the information processing apparatus 100 can perform image processing using either transfer method by controlling a transfer switching unit, which is described below, based on control information obtained from the image sensor.

For illustrative purposes, the image sensor 101, here, operates in a first transfer mode in which image data is transferred on a single line basis. This first transfer mode, namely, transfers a plurality of pixels belonging to a single line in parallel. Such a first transfer mode may also be, hereinafter, referred to as pixel-parallel transfer. The image sensor 102, here, operates in a second transfer mode to transfer a plurality of lines of pixels in parallel, in particular two lines in parallel for explaining the embodiment. Such a second transfer mode may also be, hereinafter, referred to as line-parallel transfer.

The processing engine 111 processes the image data transferred from the image sensors 101 and 102, and transfers the processed image data to the DSP 110 in the first transfer mode or the second transfer mode. How the image data is transferred to the DSP 110, namely, on a single line basis or on a multiple line basis, is not limited as long as the transfer mode matches the capability of the DSP. The DSP 110 generates output image data in an appropriate format for output based on the image data obtained from the image sensors 101 and 102.

A detailed configuration of the processing engine 111 is described below. The processing engine 111 includes the bus I/Fs 103 and 104, image processors 105 and 106 (hereinafter referred to as, simply, GP), and a selector 107. The number of lines transferred in parallel in the second transfer mode is not limited to two, such that the number may be more than one, or may also be more than two.

The image sensors 101 and 102 send differential serial bus signals as image data 112 and 113 to the bus I/Fs 103 and 104, respectively. The number of lanes used for the image data 112 and 113 is at least two, in the embodiment. The number of lanes defines a unit for separately processing the pixels in a single line. The number of lanes has a positive integer equal to or more than two.

The bus I/Fs 103 and 104 function as a first image inputting unit and as a second image inputting unit according to the embodiment. The image sensors each include a differential serial bus interface control unit. Each of the bus I/Fs 103 and 104 includes the differential serial bus interface control unit. Each of bus I/Fs 103 and 104 generates control information 116 using the differential serial bus interface control unit. The control information includes a line synchronization signal, a frame valid signal, and a line valid signal based on the image data transferred via each differential serial bus. The bus I/Fs 103 and 104 also generate image data 114 and 115 corresponding to at least two lanes. Pixels in a single lane are transferred one by one in serial. Image area information including such line information generated by the bus I/Fs 103 and 104 allows the post-stage processors to perform the image processing efficiently.

The generated image data 114 and 115 and the control information 116 are sent to the GPs 105 and 106. The GPs 105 and 106 perform the image processing of the received image data, including y correction, skew correction, and edge enhancement.

The image data 114 and 115 is transferred through data buses each of which transfers pixels of data corresponding to two lanes one by one in serial. The two lanes are used as an example of the number of lanes to explain in FIG. 1, however the number of lanes is not limited to the example and may be one, or more than three.

The selector 107 selects input from the image sensors 101 and 102. The image data selected by the selector 107 is sent to the transfer switching unit 108. The transfer switching unit 108 processes the image data according to the transfer mode which is the first transfer mode or the second transfer mode to output the data in a suitable format that the DSP 110 can process. The transfer switching unit 108, which is implemented by a circuit, controls image write/read sequence using the synchronization control signals sent from the bus I/Fs 103 and 104 and thus provide the function described above.

A bus I/F 109 includes a differential serial bus interface control unit to transfer the image data output from the transfer switching unit 108 to the DSP 110 by using LVDS. The transfer switching unit 108 sends out the line synchronization signal, the frame valid signal, and the line valid signal output from the bus I/Fs 103 and 104, and a pseudo line synchronization signal generated by the transfer switching unit 108 to the bus I/F 109. Both of the line synchronization signal and the pseudo line synchronization signal, the frame valid signal, and the line valid signal can provide image area information so that the DSP 110 can process efficiently. Using differential serial bus as the bus I/F 109 can improve noise resistance when the data is transferred to the DSP 110.

Each of these units described above referring to FIG. 1 performs the above-described operations including switching of the transfer modes under control of a controller 120.

Figure 2:
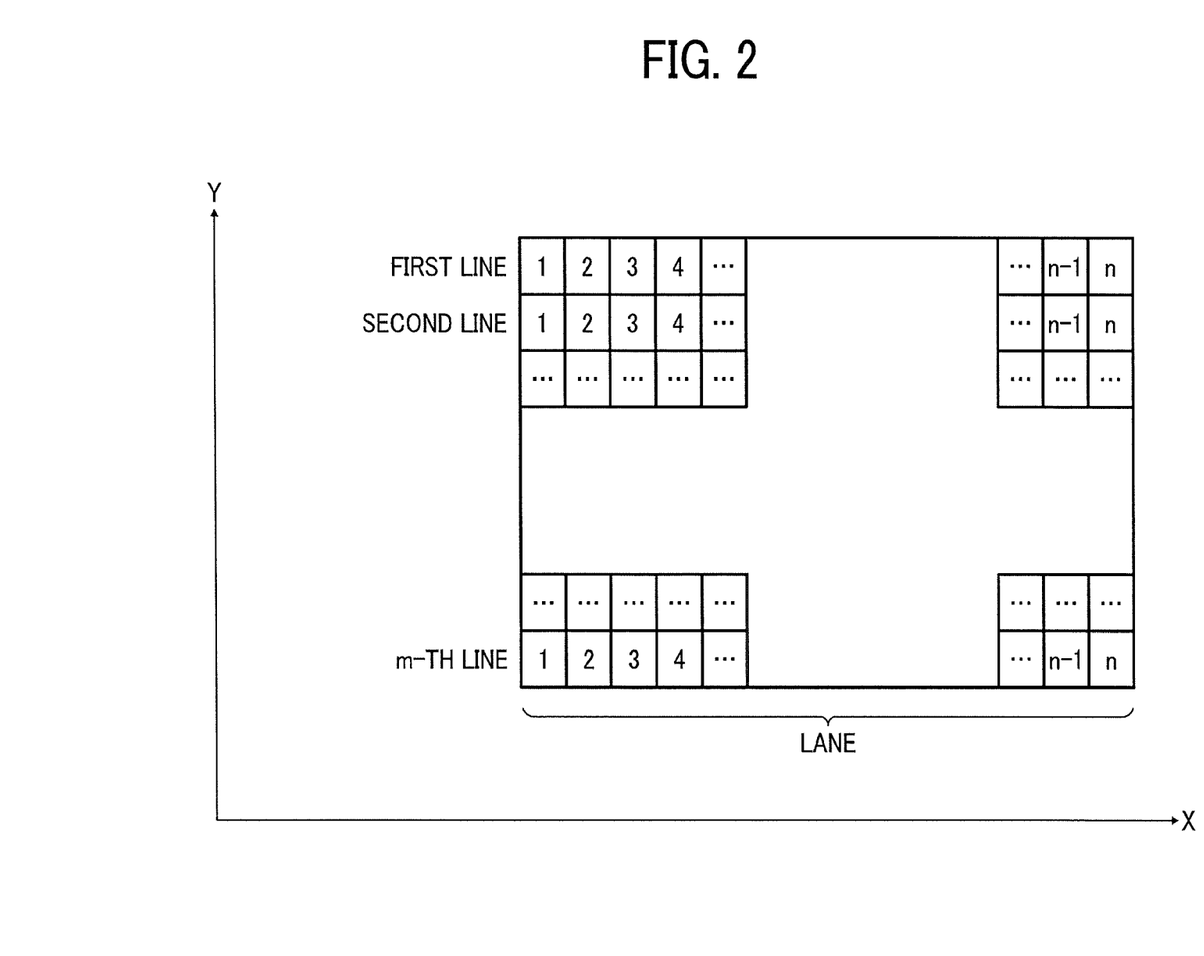
FIG. 2 is a diagram illustrating a data structure of image data generated by image sensors of the information processing apparatus illustrated in FIG. 1 according to the embodiment of the present invention.

FIG. 2 illustrates a data structure of the image data generated by the image sensors 101 and 102 according to the embodiment of the present invention. The image sensors 101 and 102 each have a plurality of imaging elements, such as photodetectors, arranged in an X-Y matrix, with each imaging element usually corresponding to one pixel of the image data. As a frame synchronization signal is output, the image sensors 101 and 102 reset a counter so that a transfer position is set to a first line. The image sensors 101 and 102 transfer pixels of data in serial starting from the first pixel in a single line or the first pixels in a plurality of lines every time a line synchronization signal is input.

Referring to FIG. 2, a concept of line and lane, each of which is pixel arrangement of the image data to be processed by the image sensor, is explained according to the embodiment. In FIG. 2, the line can be defined as a direction of pixel arrangement along a Y-axis. The lane can be defined as a direction of pixel arrangement along an X-axis. The embodiment will be described as having at least two lanes.

The two transfer modes according to the embodiment will now be described with reference to FIG. 2. In the first transfer mode, pixels belonging to the same line are transferred in parallel for a number of lanes of data. In the second transfer mode, a plurality of lines of data that is equal in number to the lanes are transferred in parallel. The first transfer mode may also be referred to as a pixel-parallel transfer mode and the second transfer mode may also be referred to as a line-parallel transfer mode.

Figure 3A:
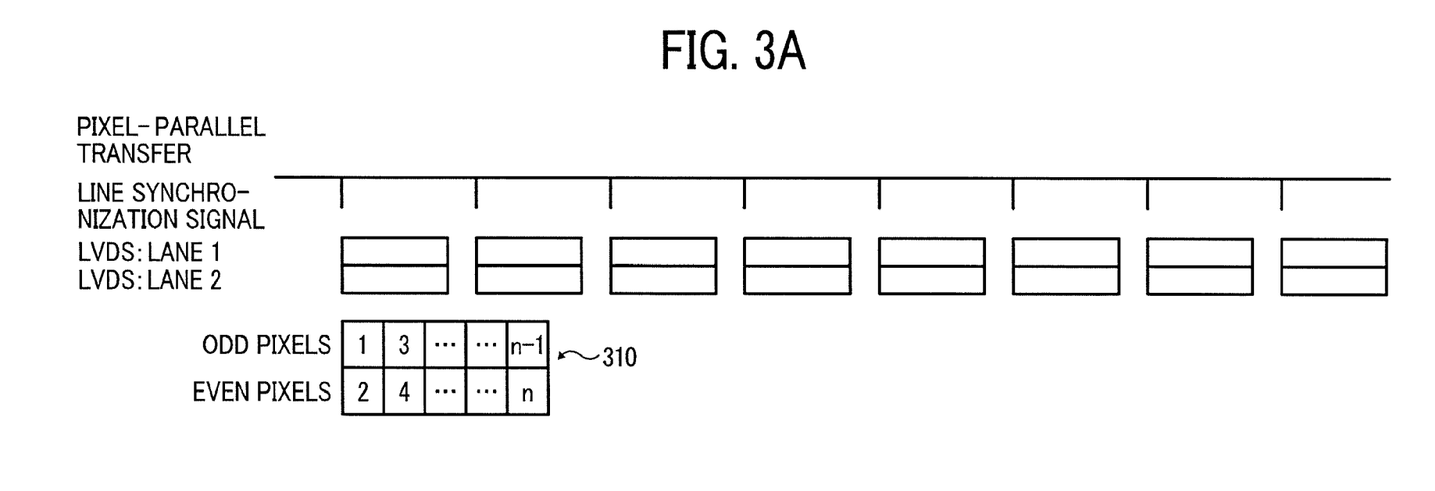
FIGS. 3A and 3B are diagrams illustrating data alignment of image data transferred, respectively, from the image sensors of FIG. 2.
Figure 3B:
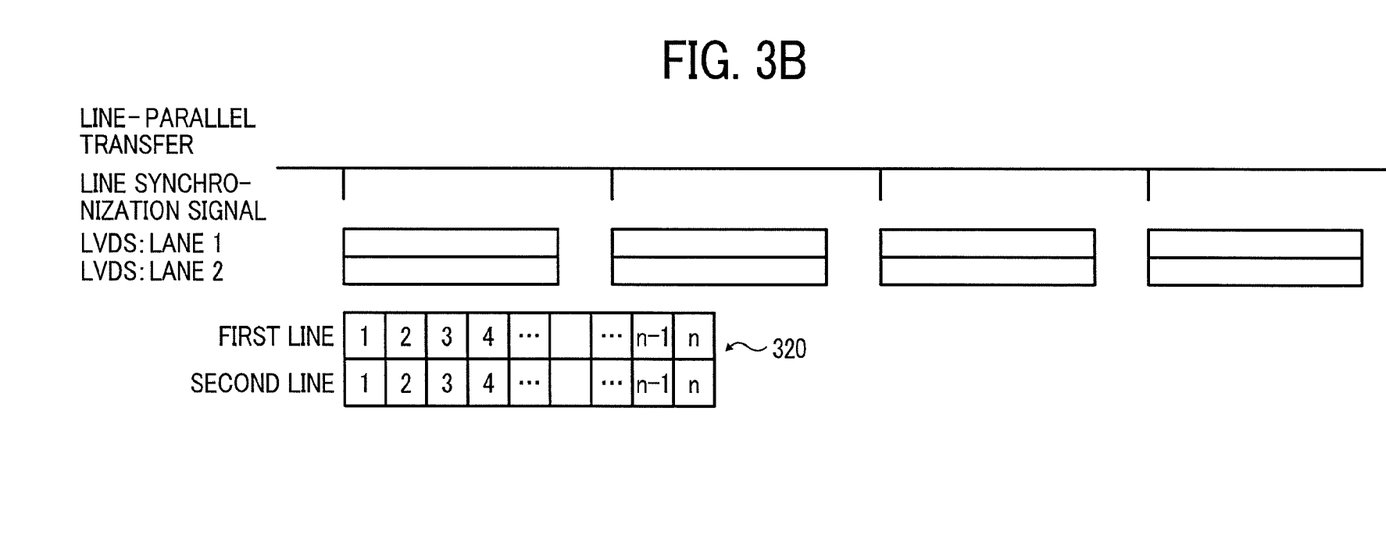

FIG. 3A and FIG. 3B illustrate time-series data alignment of the image data transferred respectively from the image sensors 101 and 102. The data alignment illustrated in FIG. 3A describes the pixel-parallel transfer that is the first transfer mode employed by the image sensor 101. In response to input of the frame synchronization signal and the line synchronization signal 117 from the DSP 110, for each line, data at a pixel position on the lane 1 of the line and data at the same pixel position on the lane 2 of the line are transferred in parallel in synchronization with the line synchronization signal. This transfer is continuously performed to send lines of data in serial. Lanes of data transferred in this mode is illustrated as a data array 310. Here in FIG. 3M, a lane is also defined as a configuration of odd pixels or even pixels.

FIG. 3B describes the line-parallel transfer that is the second transfer mode employed by the image sensor 102. In response to input of the frame synchronization signal and the line synchronization signal 117 from the DSP 110, data from the respective lanes, corresponding to lines that are subsequent, are transferred in parallel in synchronization with the line synchronization signal. This transfer is continuously performed to send sets of lines of data in serial. Lanes of data transferred in this mode is illustrated as a data array 320.

Figure 4:
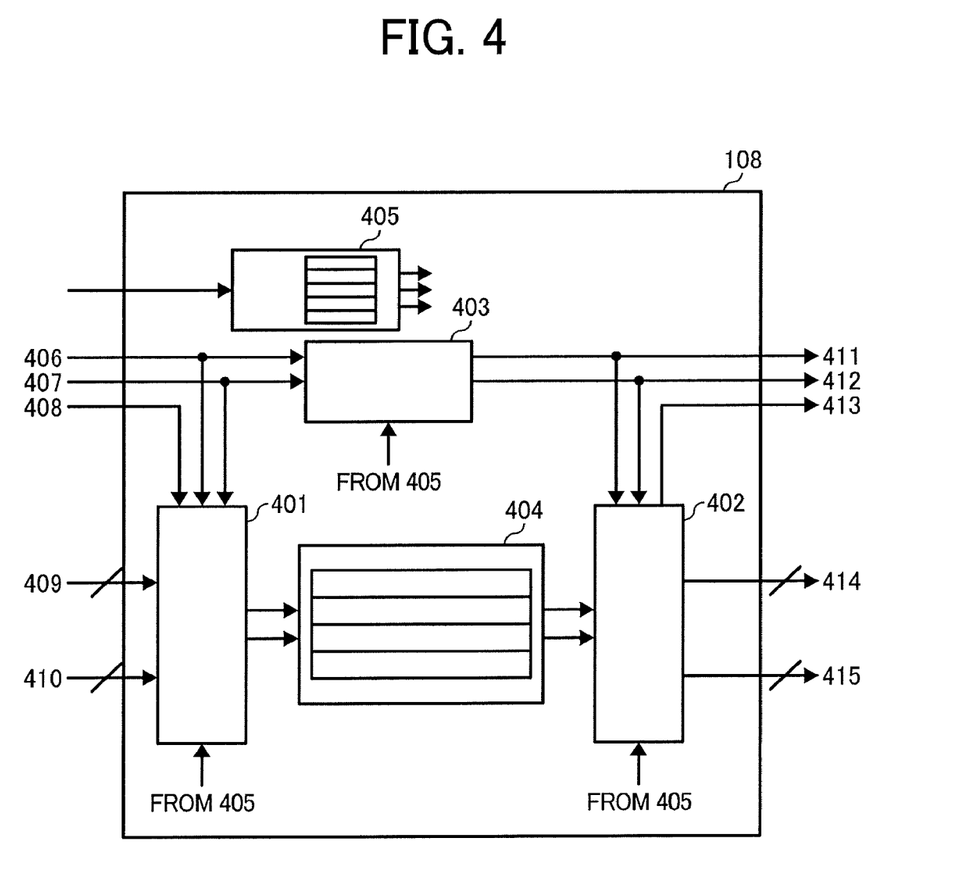
FIG. 4 is a hardware block diagram illustrating a transfer switching unit according to the embodiment of the present invention.

FIG. 4 is a hardware block diagram illustrating the transfer switching unit 108 according to the embodiment. The units illustrated in FIG. 4 are each implemented by a circuit. The transfer switching unit 108 illustrated in FIG. 4 includes a pixel position transforming unit 401, a line buffer control unit 402, a register control unit 405, a line synchronization signal control unit 403, and a line buffer 404. The pixel position transforming unit 401 stores the image data transferred from the selector 107 to the line buffer 404 based on a line synchronization signal 406 and a frame valid signal 407 in response to a control signal from the register control unit 405. The line buffer 404 preferably responses to a write request from the pixel position transforming unit 401 and a read request from a line buffer control unit 402 concurrently.

The line synchronization signal control unit 403 generates a pseudo line synchronization signal 411 and a pseudo frame valid signal 412 respectively from the line synchronization signal 406 and the frame valid signal 407 transferred via the selector 107 in response to a control signal from the register control unit 405. The pseudo line synchronization signal 411 is used to control reading from the line buffer 404 when the data is transferred in the second transfer mode in which the transfer is performed in line-parallel.

The line buffer control unit 402 controls reading image data from the line buffer 404 based on the line synchronization signal 406 or the pseudo line synchronization signal 411 and the pseudo frame valid signal 412.

The line buffer 404 stores the data having a data structure in which pixels in the same line are continuously arranged. According to the embodiment, image data corresponding to two lines are written to the line buffer as one set, and reading sequence is alternately switched (toggle-switched) for two sets of data. Through this operation, the first transfer mode that is the pixel-parallel transfer and the second transfer mode that is the line-parallel transfer are achieved.

The register control unit 405 also outputs transfer switching signals to the pixel position transforming unit 401, the line buffer control unit 402, and the line synchronization signal control unit 403. The transfer switching signals correspond to control signals for selecting input of the selector 107. The register control unit 405 also reflects the number of transferred pixels per line to a register and then issues a notification to the pixel position transforming unit 401, the line buffer control unit 402, and the line synchronization signal control unit 403 for controlling reading.

In FIG. 4, a line valid signal 408, bus lines 409 and 410 are also illustrated. The bus lines 409 and 410 transfer pixels of data transferred from the selector 107 in parallel. These bus lines 409 and 410 are each configured to have a bus width corresponding to the number of bits for one pixel so that the bus lines 409 and 410 can transfer one pixel of data. The pseudo line synchronization signal 411 is generated depending on a transfer method notified from the register control unit 405. Generating the pseudo line synchronization signal 411 allows an output mode to be switched to a pixel-parallel transfer mode when an input mode is a line-parallel transfer mode. As a result, data transferred in any mode can be transferred to the DSP 110 in a data format that the DSP 110 can process.

Additionally, the pseudo frame valid signal 412 is a signal that synchronizes with the pseudo line synchronization signal 411. A line valid signal 413 is output in synchronization with the pseudo line synchronization signal 411 and indicates that pixels of data are valid. Bus lines 414 and 415 output a plurality of pixels concurrently in synchronization with the pseudo line synchronization signal 411. The bus lines 414 and 415 transfer with bus widths each of which corresponds to the number of bits for one pixel.

Figure 5A:
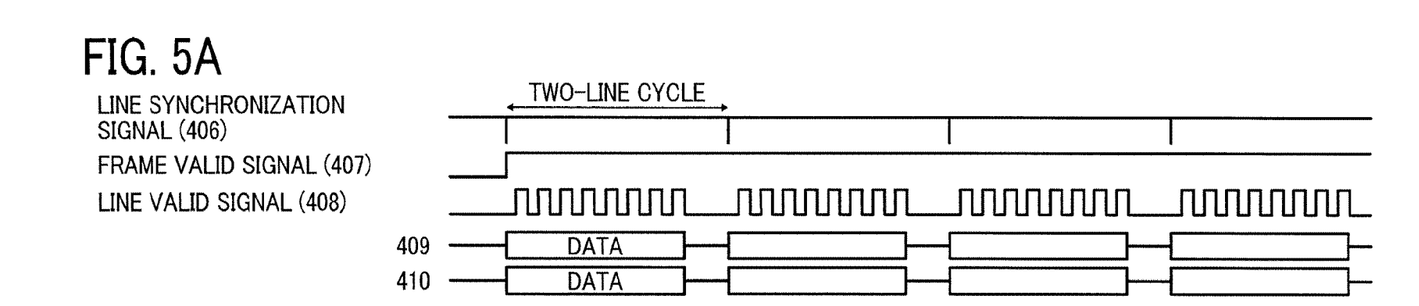
FIGS. 5A, 5B, and 5C are timing charts for illustrating states of data in transferring image data output in two-line-parallel from the image sensor according to the embodiment of the present invention.
Figure 5B:
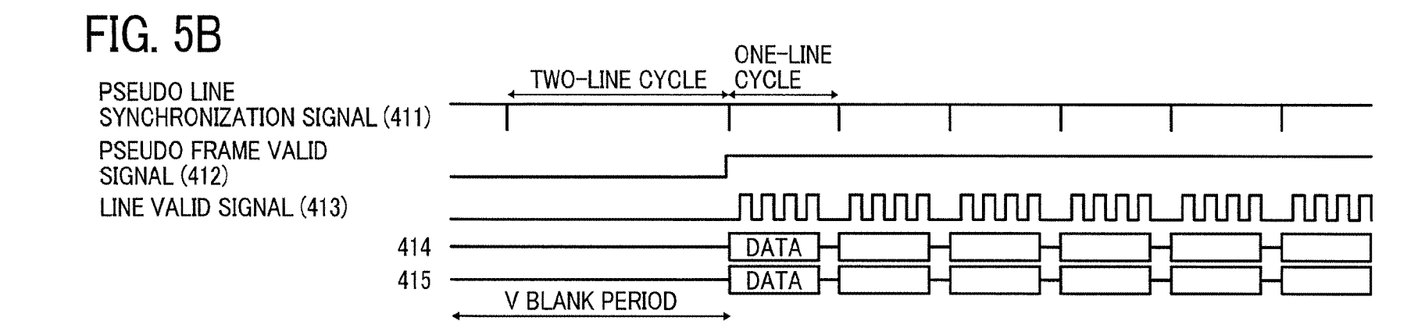
Figure 5C:
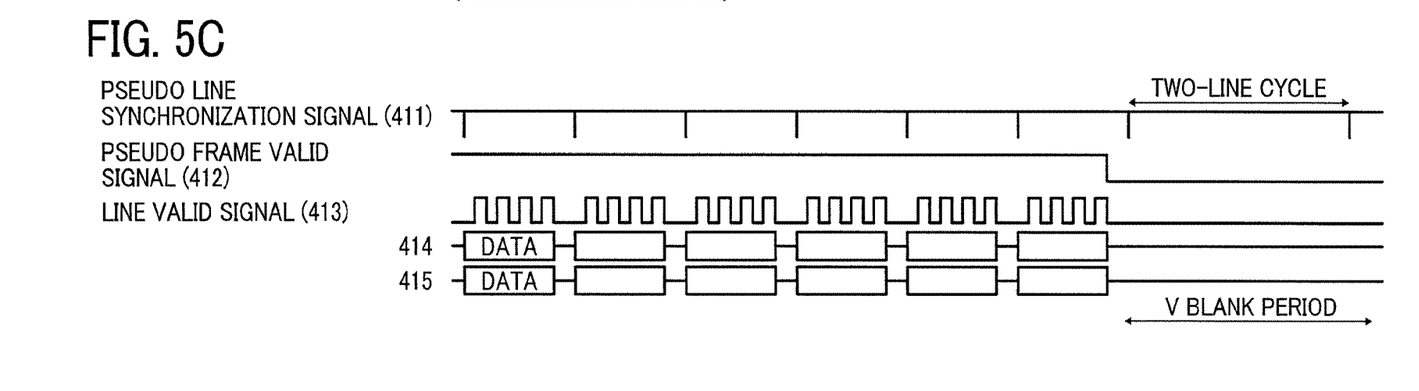

FIGS. 5A, 5B, and 5C are timing charts for illustrating states of data in transferring image data output in two-line-parallel from the image sensor 102 according to the embodiment. When the controller 120 sends an instruction to change a data transfer mode to the line-parallel transfer mode, such change information is set to a transfer mode setting register. Subsequently, the pixel position transforming unit 401, the line buffer control unit 402, and the line synchronization signal control unit 403 are notified of the change of setting.

More details will be described below in reference to the timing diagrams of FIGS. 5A, 5B, and 5C. The image data transferred in the second transfer mode from the selector 107 is input to the transfer switching unit 108 on a two-line cycle basis through the bus lines 409 and 410 as illustrated in FIG. 5A. In addition to the image data, the line synchronization signal 406, the frame valid signal 407, and the line valid signal 408 are input as control signals.

Asserting of the line synchronization signal 406 and the frame valid signal 407 indicates starting of the image area. The line synchronization signal control unit 403 starts counting the line valid signal 408 in response to the start of the image area as illustrated in FIG. 5A.

In response to receiving the instruction from the register control unit 405, the pixel position transforming unit 401 receives the image data. The pixel position transforming unit 401, then, allocates pixels of the image data in lane units to store the data to line memories in the line buffer 404, thus transforming the pixel positions.

The line buffer control unit 402 receives the pseudo line synchronization signal 411 and the pseudo frame valid signal 412, and output the line valid signal 413 that is synchronized with the line valid signal 408 from the line synchronization signal control unit 403.

The line buffer control unit 402 starts reading the image data from the line buffer 404 when the pseudo frame valid signal 412 is asserted.

After the reception of the instruction as to the second transfer mode from the register control unit 405, the pseudo frame valid signal 412 is asserted in synchronization with the pseudo line synchronization signal 411 asserting after the reception. This period is illustrated as a V blank period in FIG. 5B. The V blank period after the pseudo frame valid signal 412 is asserted is a period for a non-image area, which is not the image area. The V blank period also provides a period for storing the image data corresponding to the two lines to the line buffer 404, according to the embodiment.

The register control unit 405 asserts a pseudo line cycle issuance counter when the pseudo frame valid signal 412 is asserted and then causes the line synchronization signal control unit 403 to divide a cycle of the pseudo line synchronization signal 411 in half, namely, a two-line cycle is changed to a one-line cycle. This is illustrated in FIG. 5B. Because of this, outputting of the image data in the first transfer mode is delayed by a V blank period from inputting of the image data in the second transfer mode. This time lag can be adjusted by the post-stage bus I/F 109. Here, using the number of lanes as a denominator to divide a cycle allows for efficient processing.

By using the pseudo line synchronization signal 411, the pseudo frame valid signal 412, and the line valid signal 413 (which may be collectively referred to as "pseudo line synchronization information"), the line buffer control unit 402 reads the image data from four line memories in a line cycle in a manner that two pixels of the image data are read each time. The line buffer control unit 402 then generates data corresponding to two lines to be transferred in the first transfer mode for performing pixel-parallel transfer. Subsequently, the line buffer control unit 402 outputs the image data to the bus lines 414 and 415 that are differential serial bus lines.

According to the embodiment, the pseudo line synchronization information for controlling line timing in reading pixels of data is generated when the transfer method is changed. The pseudo line synchronization information is used for transferring the image data on a line cycle basis based on line synchronization information that sent from the image sensor 102 while a plurality of lines are processed in parallel for image processing. The pseudo line synchronization information is generated based on the line synchronization information sent from the image sensor 102 so that no more hardware for adjusting the synchronization timing is needed and thus the line-parallel processing and the pixel-parallel processing can be switched efficiently.

At the end of the image area of the image data transferred in the second transfer mode, the pseudo frame valid signal 412 is negated in synchronization with the line valid signal 413. When the pseudo line cycle issuance counter is negated, the register control unit 405 causes the line synchronization signal control unit 403 to stop dividing cycles of the pseudo line synchronization signal 411 in half. The pseudo line synchronization signal 411, accordingly, returns to operate on a two-line cycle basis. This prevents occurrence of an unnecessary pseudo line synchronization signal with high frequency, resulting in reducing difficulty in processing in the post-stage.

Figure 6:
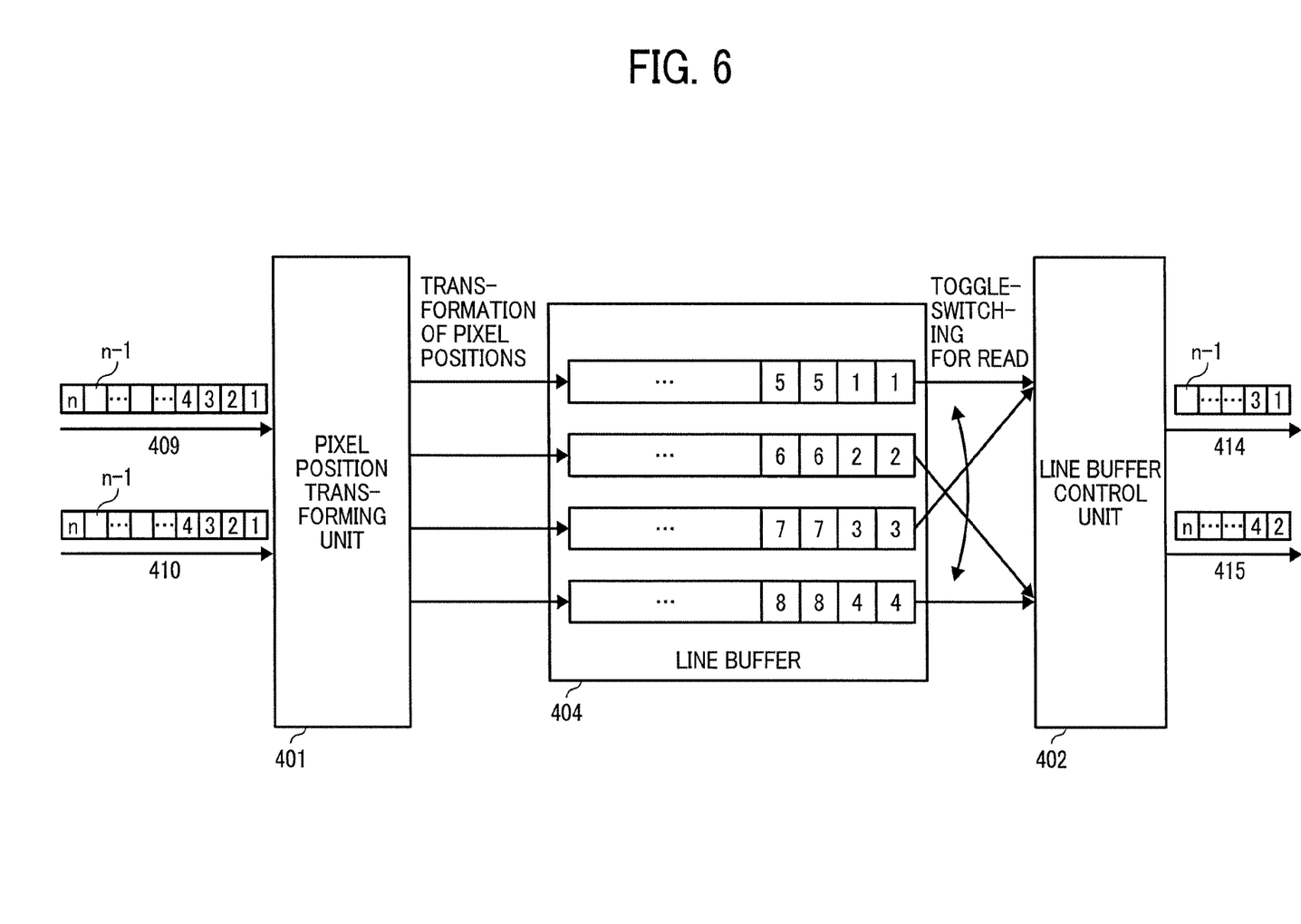
FIG. 6 is a diagram for describing, using data structures, how a data transfer mode is switched and image data is output by a pixel position transforming unit, a line buffer control unit, and a line buffer in operating with the timing described in FIG. 5 according to the embodiment of the present invention.

FIG. 6 is a diagram for describing, using data structures, how the data transfer mode is converted and the image data is output by the pixel position transforming unit 401, the line buffer control unit 402, and the line buffer 404 operating with the timing described in FIG. 5 according to the embodiment. Two lines of image data are input to the pixel position transforming unit 401 through the bus lines 409 and 410 each time.

The pixel position transforming unit 401 allocates pixels of data corresponding to two lines to the line memories per line to store four pixels each time during the one-line cycle operation. Here, an Arabic numeral in a line memory indicates a position of a pixel on a line in FIG. 6. After the V blank period, the line buffer control unit 402 reads pixels of data corresponding to one line cycle from the line buffer 404 in a manner that two pixels of data are read each time while toggle-switching the line memories to be read. The line buffer control unit 402 outputs the read image data to the bus lines 414 and 415 that are the differential serial bus lines and sends the data to the DSP 110 through the bus I/F 109.

Figure 7:
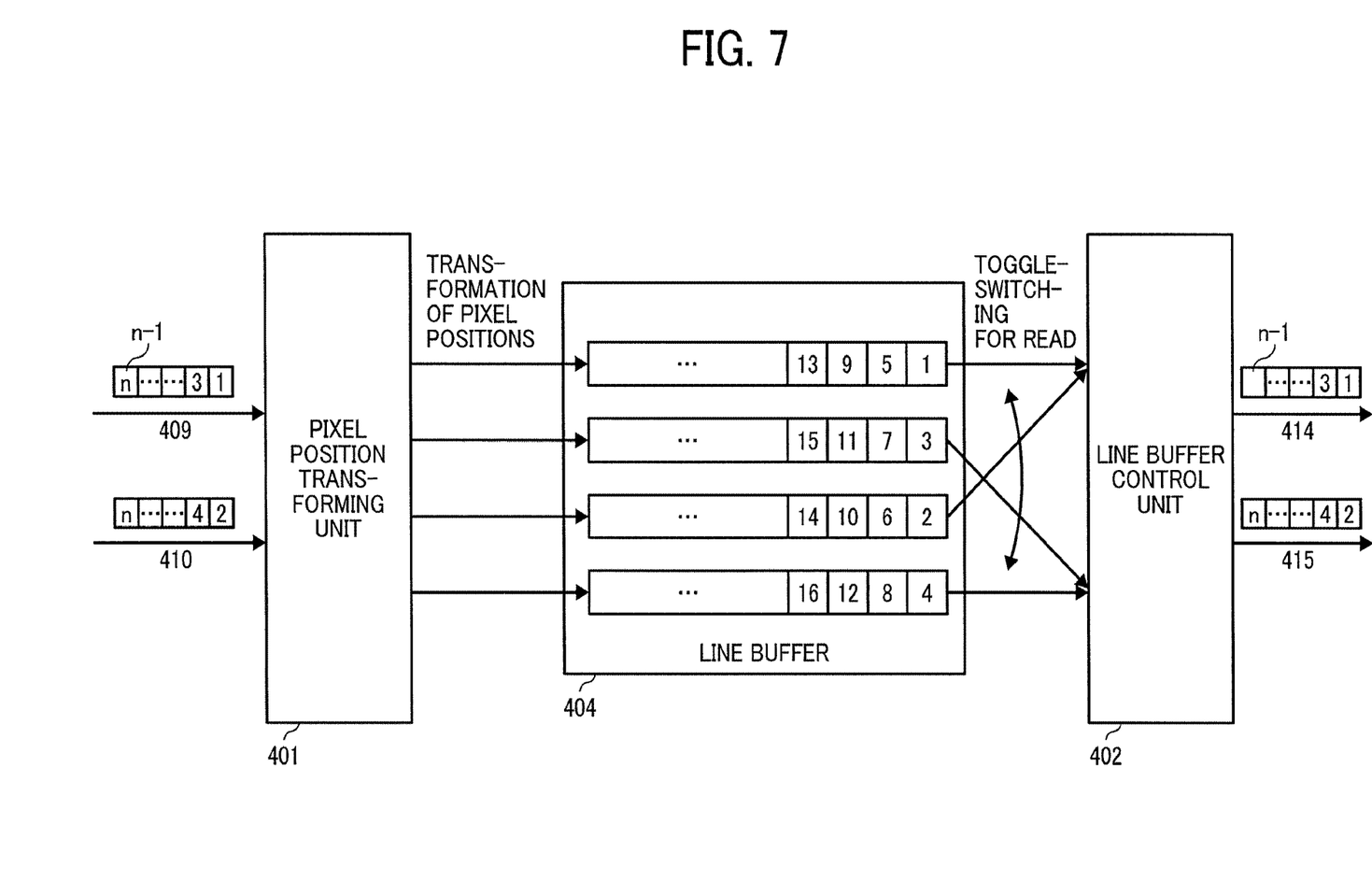
FIG. 7 is a diagram for describing output of image data without changing a data transfer mode that is a first transfer mode according to the embodiment of the present invention.

Now, referring to FIG. 7, there is illustrated a diagram for describing output of image data without changing a transfer mode that is the first transfer mode according to the embodiment. The line synchronization signal control unit 403 does not set a pseudo line cycle issuance counter. The pixel position transforming unit 401 and the line buffer control unit 402 are controlled by the pseudo line synchronization signal operating on a two-line cycle basis. At this time, the image data is transferred on a one-line cycle basis in which a cycle is shorter than that in the two-line cycle basis so that only setting synchronization timing on two-line cycle basis as illustrated in FIG. 5 is effective, resulting in efficient processing.

The pixel position transforming unit 401 writes the data to the line buffer 404 in a pixel-parallel transfer mode in a manner that two pixels in each lane are written each time. At this time, the line buffer 404 corresponding to four lines functions as line memories for two sets of two lines and performs write operation in a toggle manner line by line.

The line buffer control unit 402 reads pixels of data two by two per line even when the pseudo line cycle issuance counter is not set. In the read operation, the line memories corresponding to four lines function as the line memories corresponding to the two sets of two lines. Therefore, both of the first transfer mode and the second transfer mode can be dealt with by only changing the write operation to the line buffer 404 and reading in the same toggle manner without changing the configuration of the hardware.

Figure 8:
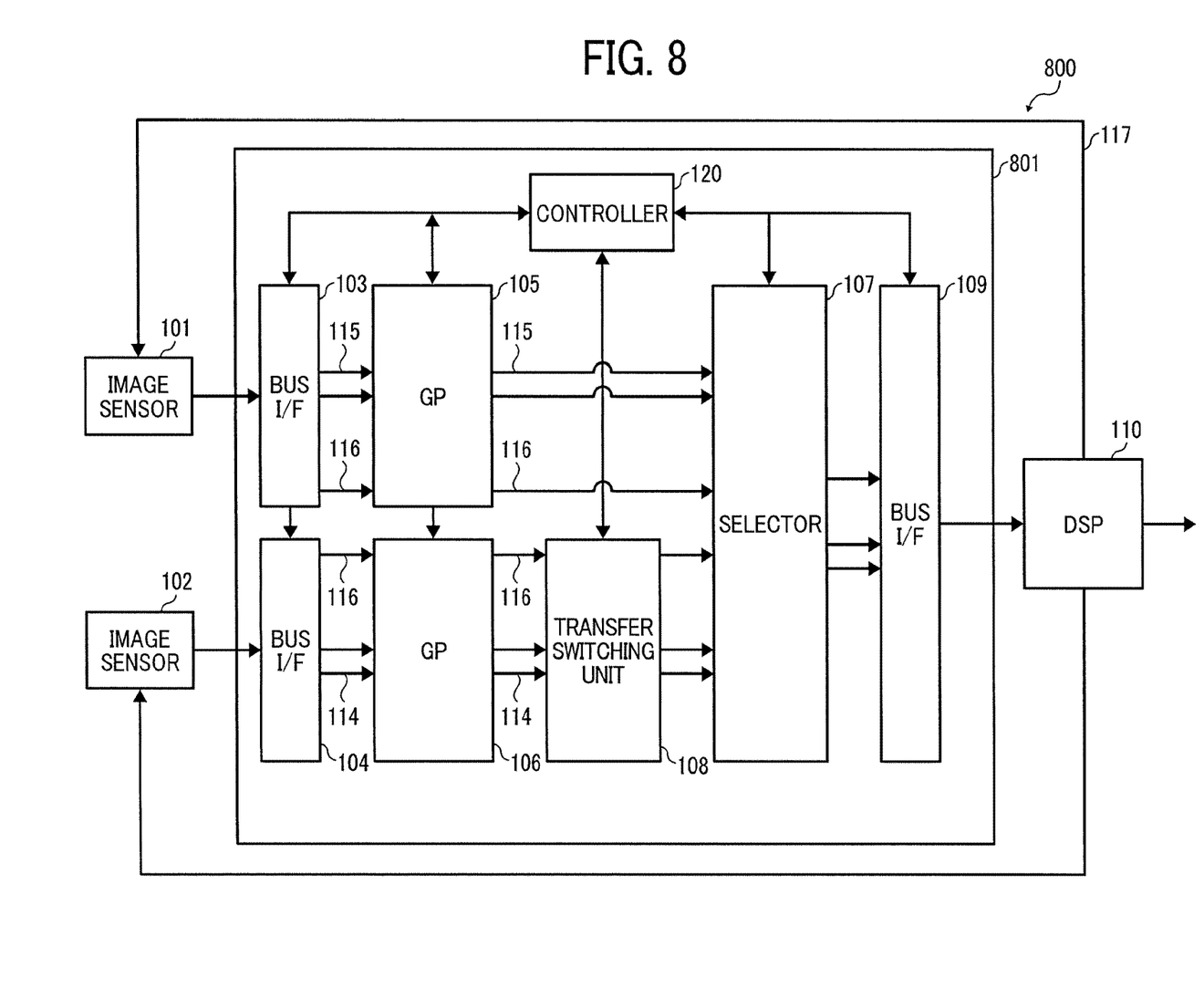
FIG. 8 is a block diagram illustrating an information processing apparatus according to another embodiment of the present invention.

FIG. 8 is a hardware block diagram illustrating an information processing apparatus 800 according to another embodiment of the present invention. In the illustrated embodiment, a processing engine 801 processes image data, transferred in the second transfer mode from the image sensor 102 with the transfer switching unit 108 and then transmits the output data to the selector 107. The selector 107 selects a signal type to be output according to an instruction of the controller 120 and then outputs to the DSP 110 through the bus I/F 109.

This embodiment also can provide an information processing apparatus enable to switch the line-parallel transfer mode to the pixel-parallel transfer mode for processing image data. The information processing apparatuses of the present invention are not particularly limited and include, for example, multi-function peripherals referred to as MFPs, personal computers, tablet PCs, and smart phones. Although the exemplary embodiments of the invention have been described and illustrated above, such description is not intended that the invention be limited to the illustrated embodiments. Numerous additional modifications and variations are possible in light of the above teachings. It is therefore to be understood that within the scope of the appended claims, the disclosure of the present invention may be practiced otherwise than as specifically described herein. For example, elements and/or features of different illustrative embodiments may be combined with each other and/or substituted for each other within the scope of this disclosure and appended claims.

What is claimed is:

1. An information processing apparatus comprising:
   a first bus interface to receive first data transferred in a pixel-parallel transfer mode, wherein a plurality of pixels belonging to a same line of the first data are transferred in parallel for a plurality of lanes of data;
   a second bus interface to receive second data transferred in a line-parallel transfer mode, wherein a plurality of lines of the second data having a same number of the lanes are transferred in parallel;
   a selector to select either the first data transferred in the pixel-parallel transfer mode or the second data transferred in the line-parallel transfer mode, as input data; and
   a transfer switching circuit to process the input data according to the selected transfer mode, wherein a line is a direction of pixel arrangement along a vertical axis and a lane is a direction of pixel arrangement along a horizontal axis.

2. The information processing apparatus of claim 1, wherein each of the first bus interface and the second bus interface includes a differential serial bus.

3. The information processing apparatus of claim 1, wherein each of the first bus interface and the second bus interface includes a control circuit and generates a line synchronization signal, a frame valid signal, and a line valid signal based on image area information.

4. The information processing apparatus of claim 1, further comprising:
   a differential serial bus to receive data that is processed by and output from the transfer switching circuit.

5. The information processing apparatus of claim 1, wherein the transfer switching circuit includes a register control circuit and generates a pseudo line synchronization signal and a pseudo frame valid signal, individually, based on a line synchronization signal used with the first bus interface.

6. The information processing apparatus of claim 5, wherein
   the register control circuit controls the pseudo line synchronization signal to be divided to be pseudo line cycles in response to the pseudo frame valid signal.

7. The information processing apparatus according to claim 6, wherein the register control circuit stops generating the pseudo line cycles when the pseudo frame valid signal is negated.

8. An information processing apparatus comprising:
   first means for receiving first data transferred in a pixel-parallel transfer mode, wherein a plurality of pixels belonging to a same line of the first data are transferred in parallel for a plurality of lanes of data;
   second means for receiving second data transferred in a line-parallel transfer mode, wherein a plurality of lines of the second data having a same number of the lanes are transferred in parallel;
   means for selecting either the first data transferred in the pixel-parallel transfer mode or the second data transferred in the line-parallel transfer mode, as input data; and
   means for processing the input data according to the selected transfer mode, wherein a line is a direction of pixel arrangement along a vertical axis and a lane is a direction of pixel arrangement along a horizontal axis.

9. The information processing apparatus of claim 8, wherein each of the first means for receiving the first data and the second means for receiving the second data includes a differential serial bus.

10. The information processing apparatus of claim 8, wherein each of the first means for receiving the first data and the second means for receiving the second data includes another means for generating a line synchronization signal, a frame valid signal, and a line valid signal based on image area information.

11. The information processing apparatus of claim 8, further comprising:
    third means for receiving data that is processed by and output from the means for processing.

12. The information processing apparatus of claim 8, wherein the means for processing includes another means for generating a pseudo line synchronization signal and a pseudo frame valid signal, individually, based on a line synchronization signal used with the first means.

13. The information processing apparatus of claim 12, wherein
    the other means controls the pseudo line synchronization signal to be divided to be pseudo line cycles in response to the pseudo frame valid signal.

14. The information processing apparatus of claim 13, wherein
    the other means stops generating the pseudo line cycles when the pseudo frame valid signal is negated.

15. A method of transferring data comprising:
    receiving, at a first bus interface, first data transferred in a pixel-parallel transfer mode, wherein a plurality of pixels belonging to a same line of the first data are transferred in parallel for a plurality of lanes of data;
    receiving, at a second bus interface, second data transferred in a line-parallel transfer mode, wherein a plurality of lines of the second data having a same number of the lanes are transferred in parallel;
    selecting either the first data transferred in the pixel-parallel transfer mode or the second data transferred in the line-parallel transfer mode, as input data; and
    processing the input data according to the selected transfer mode, wherein a line is a direction of pixel arrangement along a vertical axis and a lane is a direction of pixel arrangement along a horizontal axis.

16. The method of claim 15, further comprising:
    generating a line synchronization signal, a frame valid signal, and a line valid signal based on image area information.

17. The method of claim 15, further comprising:
    generating a pseudo line synchronization signal and a pseudo frame valid signal, individually, based on a line synchronization signal used with the first bus interface.

18. The method of claim 17, further comprising:
    controlling the pseudo line synchronization signal to be divided to be pseudo line cycles in response to the pseudo frame valid signal.

19. The method of claim 18, further comprising:
    stopping generating the pseudo line cycles when the pseudo frame valid signal is negated.

* * * * *